United States Patent [19]

Allen et al.

[11] 4,302,669

[45] Nov. 24, 1981

[54] NEUTRON THERMALIZATION TIME LOGGING

[75] Inventors: Linus S. Allen, Dallas; William R. Mills, Jr., Duncanville, both of Tex.

[73] Assignee: Mobil Oil Corporation, Fairfax, Va.

[21] Appl. No.: 55,934

[22] Filed: Jul. 9, 1979

[51] Int. Cl.³ ............................................. G01V 5/00
[52] U.S. Cl. .................................. 250/264; 250/265; 250/269
[58] Field of Search ................ 250/264, 265, 269, 266

[56] References Cited

U.S. PATENT DOCUMENTS

| | | | |
|---|---|---|---|
| 3,487,211 | 12/1969 | Youmans | 250/269 |
| 3,497,692 | 2/1970 | Mills | 250/269 |
| 3,800,150 | 3/1974 | Givens | 250/269 |

Primary Examiner—Alfred E. Smith
Assistant Examiner—Carolyn E. Fields
Attorney, Agent, or Firm—C. A. Huggett; Michael G. Gilman; George W. Hager

[57] ABSTRACT

Method and apparatus for pulsed neutron logging employing detectors of different energy-dependent sensitivities to neutrons at energy levels less than the chemical binding energy of hydrogen in hydrogenous fluids found in subterranean formations. Fast neutrons from the pulsed neutron source enter the subterranean formation under investigation and are moderated therein to form populations of slow neutrons during a thermalization period occurring subsequent to the fast neutron burst and a thermal equilibrium diffusion period occurring subsequent to the thermalization period. The detectors are employed to obtain count rate measurements during at least one and preferably two time windows falling within the thermalization period and during a later time window occurring within the thermal equilibrium diffusion period. The count rate measurements may be employed in order to arrive at a parameter representative of the time constant of the thermalization period in order to characterize the formation with respect to its relative oil-water content.

12 Claims, 4 Drawing Figures

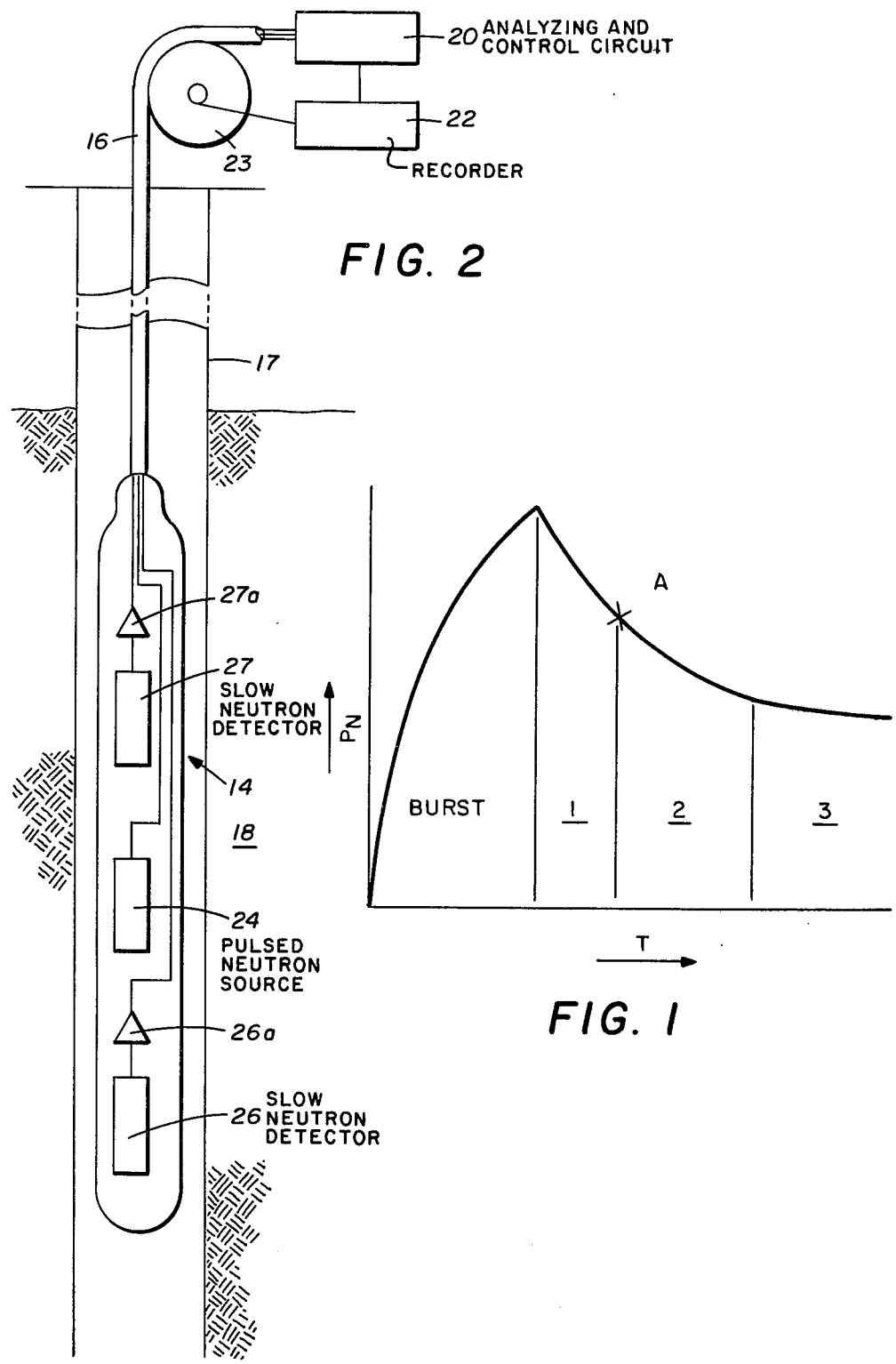

NEUTRON THERMALIZATION TIME LOGGING

BACKGROUND OF THE INVENTION

This invention relates to radioactive well logging and more particularly to well logging processes and systems for irradiating subterranean formations with bursts of fast neutrons and characterizing the fluid content of the formation on the basis of the thermalization period of the subsequently produced epithermal neutron population.

Various techniques may be employed in order to characterize subterranean formations with regard to their mineral content or lithologic characteristics such as porosity or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal neutrons employing two detectors at different spacings from the source or by measuring epithermal neutrons with a single detector.

In pulsed neutron logging procedures, the formations are irradiated with repetitive bursts of fast neutrons, normally neutrons exhibiting an energy greater than 1 Mev. When the fast neutrons enter the formation, they are moderated, or slowed down, by interaction with nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., all of the energy lost by the neutron is acquired as kinetic energy by the nucleus with which it collides. In inelastic scattering only some of the energy lost by the neutron is acquired as kinetic energy by the nucleus with which it collides. The remaining energy loss generally takes the form of gamma radiation emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary, it is normally placed in the range of 0.1–1 electron volt.

The populations of neutrons at the various energy levels decay with time following primary irradiation and thus offer means of characterizing the formation. For example, in the case of elastic scattering, which predominates for energies between a few ev and about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a qualitative indication of the amount of hydrogenous material present which in turn may be indicative of the porosity of the formation. For example, U.S. Pat. No. 3,487,211 to Youmans discloses pulsed neutron logging techniques which involve the detection of thermal neutrons, epithermal neutrons, and fast neutrons. The fast neutron detection in Youmans is employed to monitor the output of the fast neutron source. The epithermal neutron detection is employed to obtain an indication of the decay of the epithermal neutron count in order to arrive at an indication of porosity. Epithermal neutron detection may be accomplished over successive time windows or over two overlapping time windows one of which completely encompasses the other. U.S. Pat. No. 3,800,150 to Givens discloses another pulsed neutron logging technique in which epithermal neutron decay or thermal neutron decay can be measured by employing time windows for detection which partially overlap each other. Thus in the case of the measurement of epithermal neutron decay, the measurement windows may exhibit durations on the order of 20 microseconds with the first time window starting during or immediately upon termination of the fast neutron burst and the second time window beginning perhaps 10 microseconds after the start of the first time window and extending 10 microseconds after termination of the first time window.

Low energy epithermal neutrons may also be detected in a manner to distinguish between oil and water within the formation. Thus, U.S. Pat. No. 3,497,692 to Mills discloses a pulsed neutron logging technique employing two neutron detectors both responsive to relatively low energy epithermal neutrons but within different energy ranges. For example, one detector may exhibit a substantial response within the range of 0.2–0.8 electron volt and the other within the range of about 0.1–0.6 electron volt.

The detector responses are gated over a plurality of time intervals to count rate meters. The outputs from the count rate meters are applied to a subtraction unit where the differences in count rates from the two detectors for each of the time intervals is obtained. The output from the subtraction unit is then recorded.

As noted in the Mills patent, when the energy of the neutron falls below about 1 electron volt, the hydrogen nuclei which are effective in moderating the neutrons to lower energy levels appear to be chemically bound to the other atoms in the molecule. In the case of a scattering reaction with a hydrogen atom in a relatively high molecular weight hydrocarbon molecule, the energy loss due to the scattering reaction is less than in the case of a collision between a neutron and a hydrogen atom in a relatively light water molecule. Therefore, a greater number of scattering collisions are required in oil than in water for the neutron to be slowed down to a given energy level. The variation in the output from the difference unit thus provides an indication of the character of the hydrogenous fluid within the formation.

SUMMARY OF THE INVENTION

In accordance with the present invention, there are provided new and improved well logging processes and systems in which the formation under investigation is characterized as to its water or oil content on the basis of slow neutrons detected by detectors of different energy-dependent sensitivities. In carrying out the invention, the formation under investigation is irradiated with a burst of fast neutrons. The fast neutrons enter the formation and are moderated therein to form a population of slow neutrons. The neutron population within the formation is comprised predominantly of epithermal neutrons during a thermalization period occurring subsequent to the fast neutron burst and predominantly of thermal neutrons during a thermal equilibrium diffusion period occurring subsequent to the thermalization period. The detectors having different energy-dependent sensitivities to neutrons are employed to measure the count rate of slow neutrons within energy ranges having lower limits which are less than the chemical binding energy of hydrogen in hydrogenous fluid contained within the formation. Count rate measurements are obtained during at least one and preferably two time windows falling within the thermalization period. In addition, count rate measurements from both detectors are obtained during the thermal equilibrium diffusion period. Based upon these measurements the time constant of the thermalization period may be determined in order to characterize the formation with respect to its oil and water content.

BRIEF DESCRIPTION OF THE DRAWINGS

FIG. 1 is a graph illustrating the detectable neutron population within a formation subsequent to a fast neutron burst;

FIG. 2 is a schematic illustration showing a logging system embodying the present invention;

DESCRIPTION OF SPECIFIC EMBODIMENTS

Figure 3:
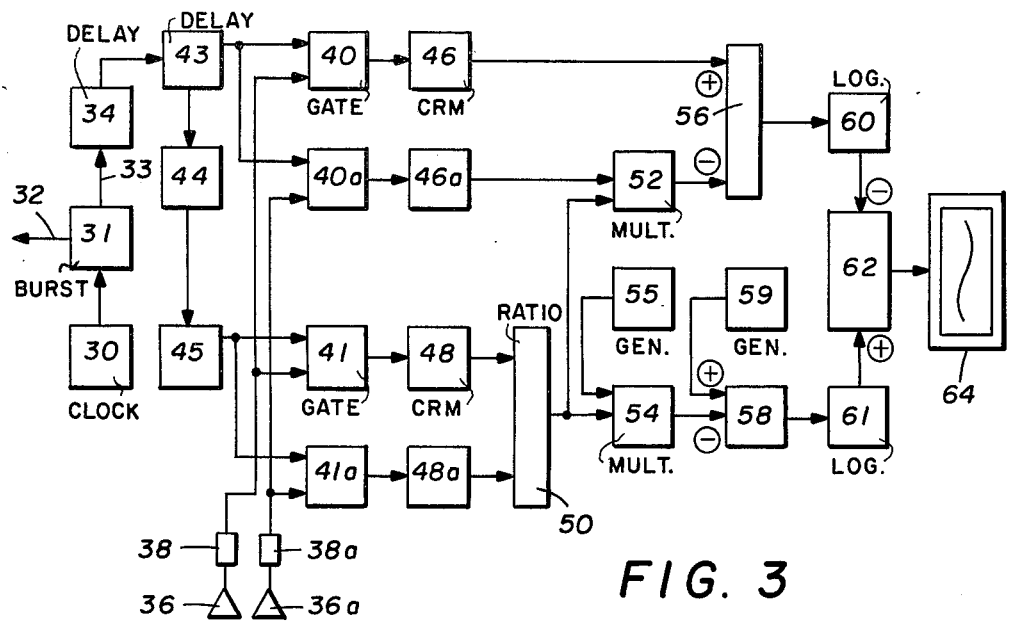
FIG. 3 is a block schematic of circuitry which may be employed in the system of FIG. 2 in accordance with one embodiment of the invention.

As noted previously, the predominant moderating mechanism for neutrons with energy between a few ev and about 1 Mev is elastic scattering and in subterranean formations in which well logging operations are carried out the hydrogen nuclei are the predominant factor in the slowing down process. The moderating effect of a hydrogen nucleus upon an epithermal neutron depends upon the energy of the neutron in relation to the chemical binding energy of the hydrogen. For neutron energies greater than the chemical binding of hydrogen in a molecule, all hydrogen atoms regardless of their molecular environment act the same when neutrons scatter from them. For neutron energies below the chemical binding energy of the hydrogen, the entire molecule which contains the hydrogen takes part in the scattering reaction. Thus, the neutron acts as though it were scattered from a heavier nucleus and the moderating effect of the hydrogen is significantly less than for scattering reactions which occur at the higher energy levels.

From the foregoing discussion it will be recognized that the moderating effect of hydrogen on epithermal neutrons with energies at or above the chemical binding energy of hydrogen is the same regardless of the molecular environment of the hydrogen atoms. On the other hand, at neutron energies below the chemical binding energy of hydrogen, the molecular environment of the hydrogen nuclei available for elastic scattering reactions becomes significant. The transition between these two energy regimes is not sharp. For example, the chemical binding energy of hydrogen in water at 20° C. is about 4.4 electron volts. The chemical binding energy of water in a hydrocarbon molecule (the H-C bond) under the same conditions is about 3.5 electron volts. At energies of this level and above, the neutron scattering mechanism is substantially "transparent" to the molecular environment of the hydrogen. As the neutron energy level falls below the range of 3.5 to 4.4 electron volts, the effect of the molecular environment upon the scattering reaction becomes progressively stronger as the neutron energy level declines.

When a burst of fast neutrons enters a fluid saturated earth formation, the neutron population detectable in a downhole logging tool may be characterized as falling within three successive periods: the slowing down period, the thermalization period, and the thermal equilibrium diffusion period. These periods are shown schematically in FIG. 1 in which the curve A is a graph of the log of the neutron population, $P_N$, plotted on the ordinate versus the time, T, in microseconds plotted on the abscissa. In FIG. 1, the slowing down period occurring immediately subsequent to the fast neutron burst is characterized by region 1, the thermalization period by region 2, and the thermal equilibrium diffusion period by region 3.

In a rock formation saturated with a hydrogenous fluid such as oil or water, the slowing down period is brief, ranging from a few microseconds in high porosity formations to perhaps 30 microseconds in low porosity formations. The thermalization period is generally longer than the slowing down period but its duration is still measured in only tens of microseconds. About 50 to 150 microseconds after termination of the fast neutron burst, the thermal equilibrium diffusion period starts. This period continues for a duration of up to a few milliseconds until all of the neutrons are captured by materials in the formation or the borehole.

In the thermalization period, most of the detected neutrons have energies only slightly above the average energy of fully thermalized neutrons and are well below the chemical binding energies of hydrogen in water and in petroleum hydrocarbons. Thus, the time constant associated with the thermalization period is dependent upon the molecular environment of the hydrogen atoms which enter into the scattering collisions. Thus for a formation of a given composition and porosity, the time constant of the thermalization period for the formation saturated with oil would be greater than for the same formation saturated with water.

It will be noted that curve A of FIG. 1, which is representative of free neutrons across the energy spectrum, does not purport to describe the total neutron population in an infinite medium but rather the neutron population at a fixed point relative to the fast neutron source. The decay of neutron flux at this point is attributable to a number of factors including spatial diffusion, thermal neutron capture, and capture of neutrons above the thermal level primarily in the lower epithermal region. The predominant decay mechanism of thermal neutrons, and hence the predominant decay mechanism during the thermal equilibrium diffusion period, is thermal neutron capture which is dependent upon the macroscopic absorption cross-section of the formation as dictated by the capture cross-sections of constituent elements of the formation, primarily chlorine. However, thermal neutron capture also contributes to decay of the neutron flux during the thermalization period.

The contribution to the decay of neutron flux due to thermal neutron capture is primarily a function of chlorine content and thus the water salinity. As noted previously, the decay of epithermal neutrons below the chemical binding energy of hydrogen is dependent upon the molecular environment of the hydrogen nuclei available for the scattering reactions. In the present invention, the epithermal neutron flux during the thermalization period, and preferably the decay rate of epithermal neutrons during this period, is measured to allow the formation to be characterized with respect to its water or oil content in a manner which is independent of the macroscopic absorption cross-section of the formation and hence of its chlorine content. This is accomplished in the present invention through the use of two detectors having different energy-dependent sensitivities to neutrons. Each detector is gated to provide at least two count rates, at least one occurring in the thermalization period and at least one occurring in the thermal equilibrium diffusion period.

As described by Beckurts and Wirtz, NEUTRON PHYSICS, Springer-Verlag, New York Inc., 1964, at pages 398–404, the time dependence of the thermalization process can be observed through the use of two detectors of different energy-dependent sensitivites. Thus, as set forth in equation (18.3.2) of Beckurts and Wirtz (page 400), the neutron count rate observed with a neutron detector whose energy-dependent sensitivity is $\Sigma(E)$ is given by the following relationship:

$$Z(t) = Z_0 e^{-v\Sigma_a t} + Z_1 e^{-\left(v\Sigma_a + \frac{1}{T_{th}}\right)t} \quad (1)$$
+ higher terms which decay rapidly wherein:
v is the average velocity of thermal neutrons,
$\Sigma_a$ is the average macroscopic absorption cross-section for thermal neutrons,
t is the time subsequent to the fast neutron burst at which the neutron flux is measured,
$T_{th}$ is the thermalization time constant,
$Z(t)$ is the neutron flux measured at time t, and
$Z_0$ and $Z_1$ are time independent coefficients which depend upon the energy-dependent sensitivity of the detector, $\Sigma(E)$, as described in greater detail by Beckurts and Wirtz.

For a second detector located the same distance from the neutron source as the first detector but having a different energy-dependent sensitivity to neutrons, $\Sigma'(E)$ then as described by Beckurts and Wirtz at page 400, the neutron count rate may be expressed by the following relationship:

$$Z'(t) = Z_0' e^{-v\Sigma_a t} + Z_1' e^{-\left(v\Sigma_a + \frac{1}{T_{th}}\right)t} \quad (2)$$
+ higher terms which decay rapidly $Z'(t)$, $Z'_0$ and $Z'_1$ are as described above, but with respect to the second detector.

The relationship between the time constant, $T_n$, for the thermal equilibrium diffusion period and the macroscopic capture cross-section, $\Sigma_a$, and velocity, v, may be defined by the following equation:

$$T_n = 1/v\Sigma_a \quad (3)$$

Thus equations (1) and (2) may be rewritten, respectively, as $$Z(t) = Z_0 e^{-\frac{t}{T_n}} + Z_1 e^{-t\left(\frac{1}{T_n} + \frac{1}{T_{th}}\right)} \quad (4)$$

$$Z'(t) = Z_0' e^{-\frac{t}{T_n}} + Z_1' e^{-t\left(\frac{1}{T_n} + \frac{1}{T_{th}}\right)} \quad (5)$$

Since the thermalization period time constant, $T_{th}$, is significantly shorter than the time constant, $T_n$, for the thermal equilibrium diffusion period, the second term in equations (4) and (5) will decay rapidly compared to the first term. Thus, for some sufficiently long value of time after the fast neutron burst (within the thermal equilibrium diffusion period), a measure of the counting rate ratio, $Z'(t)/Z(t)$ will provide a good approximation of the ratio $Z'_0/Z_0$. This ratio is identified herein as K.

For neutron count rate measurements made during an earlier time period within the thermalization region, $KZ(t)$ can be subtracted from $Z'(t)$ to obtain the following relationship:

$$Z'(t) - KZ(t) = Z_0' e^{-\frac{t}{T_n}} + Z_1' e^{-t\left(\frac{1}{T_n} + \frac{1}{T_{th}}\right)} \quad (6)$$
$$- K\left(Z_0 e^{-\frac{t}{T_n}} + Z_1 e^{-t\left(\frac{1}{T_n} + \frac{1}{T_{th}}\right)}\right)$$

Since $K = Z'_0/Z_0$, then $$Z_0' e^{-\frac{t}{T_n}} = KZ_0 e^{-\frac{t}{T_n}}$$

and equation (6) becomes:

$$Z'(t) - KZ(t) = (Z_1' - KZ_1) e^{-t\left(\frac{1}{T_n} + \frac{1}{T_{th}}\right)} \quad (7)$$

Since $T_n$ is much greater than $T_{th}$, the counting rate difference $Z'(t) - KZ(t)$ will be strongly dominated by the desired time constant, $T_{th}$, for the thermalization period. Thus, disregarding $T_n$, equation (7) can be solved for $T_{th}$ to provide the following relationship:

$$T_{th} = \frac{t}{\ln\left(\frac{Z_1' - KZ_1}{Z'(t) - KZ(t)}\right)} \quad (8)$$

For neutron count rate measurements made at two time periods within the thermalization region and again disregarding $T_n$, equation (7) can be written as follows:

$$Z'(t_1) - KZ(t_1) = (Z_1' - KZ_1) e^{\frac{-t_1}{T_{th}}} \quad (9)$$

$$Z'(t_2) - KZ(t_2) = (Z_1' - KZ_1) e^{\frac{-t_2}{T_{th}}} \quad (10)$$

wherein:
$Z'(t_1)$ is the neutron flux measured at a first time $t_1$ subsequent to the fast neutron burst, and
$Z'(t_2)$ is the neutron flux measured at a second time $t_2$ subsequent to the fast neutron burst. The count rates measured at the first time period $t_1$ can be divided by the count rates measured at the second time period $t_2$ in order to arrive at the following relationship:

$$T_{th} = \frac{t_2 - t_1}{\ln(Z'(t_1) - KZ(t_1)) - \ln(Z'(t_2) - KZ(t_2))} \quad (11)$$

Turning now to FIG. 2, there is illustrated a pulsed neutron logging system embodying the present invention. The well logging system comprises a logging tool 14 which is suspended from a cable 16 within a well 17 traversing a subterranean formation of interest illustrated by reference character 18. The well normally will be lined by casing and filled with a fluid such as drilling mud, oil, or water. Signals from the logging tool are transmitted uphole via suitable conductors in the cable 16 to an analyzing and control circuit 20 at the surface. Circuit 20 operates on the downhole measurements as explained in greater detail hereinafter and applies one or more output functions to a recorder 22. Alternatively, all control and measuring circuits may be located within the logging tool and only the signals to be recorded on recorder 22 transmitted over cable 16. As the logging tool is moved through the hole, a depth recording means such as measuring sheave 23 produces a depth signal which is applied to recorder 22, thus correlating the downhole measurements with the depths at which they are taken.

The logging tool 14 comprises a pulsed neutron source 24 and slow neutron detectors 26 and 27. These detectors preferably are located the same distance from the source. Detectors 26 and 27 both are responsive to epithermal neutrons within an energy range having a lower limit which is less than the chemical binding energy of hydrogen in the formation fluids, but have different energy-dependent sensitivities to neutrons. The source 24 may be any suitable pulsed fast neutron source but preferably will taken the form of a D-T accelerator comprising an ion source of deuterium and a target of tritium. Trigger pulses of a positive polarity are periodically applied under control of the uphole or downhole circuitry to the deuterium source in order to ionize the deuterium. The deuterium ions thus produced are accelerated to the target by a high negative voltage and the resulting reaction between the deuterium ions and the tritium produces bursts of neutrons having an energy of about 14 Mev. The neutron bursts from the source 24 normally will be of a duration of 1 to 5 microseconds with an interval between the bursts of about 100 to 1,000 microseconds to provide a pulse repetition rate of 1,000 to 10,000 neutron bursts per second.

The detectors 26 and 27 may be of any suitable type as described in greater detail hereinafter. While only a single detector of each type is shown, it is understood that the logging tool may comprise a plurality of detectors of each type connected in parallel with one another and in series with the measurement circuitry. The outputs from detectors 26 and 27 are amplified in the logging tool by means of amplifiers 26a and 27a and transmitted to the surface via suitable conductors in cable 16.

Each of the detectors 26 and 27 is operated in conjunction with suitable gating circuitry to selectively measure the count rate of the epithermal neutrons over each of a plurality of time windows occurring subsequent to the fast neutron burst. At least one time window, and preferably at least two time windows, occurs during the thermalization period. Another time window during which the neutron count rate is measured by the detectors 26 and 27 occurs during the thermal equilibrium diffusion period and is employed to arrive at the ratio K described previously. The gating circuitry may be employed to render the downhole neutron detectors operative or responsive to the slow neutrons only during the desired measuring windows or the downhole detectors may be continuously responsive to slow neutrons and the gating circuitry then employed to gate the detector outputs to separate measuring channels during the selected time windows. The latter mode of operation usually will be preferred particularly where the detectors measure count rates during two time windows occurring within the thermalization period.

Turning now to FIG. 3, there is shown one form of control and analysis circuitry suitable for use in the present invention. The system shown in FIG. 3 operates under control of a timing pulse source 30 such as a 10-kilohertz clock which is connected to a burst control unit 31. Burst control unit 31 has an output 32 leading to the control of the neutron generator and an output 33 leading to a delay unit 34 which controls the operation of the measuring circuits for detectors 26 and 27. Delay unit 34 may take the form of a monostable multivibrator which responds to sync pulses from the burst unit 31 to produce a time delay pulse which is applied to the measuring circuits for detectors 26 and 27.

The detector output from detector 26 is applied to the measuring circuitry through an amplifier 36 and a pulse shaper 38. The output from detector 27 is similarly applied to the measuring circuitry through an amplifier 36a and a pulse shaper 38a. Pulse shapers 38 and 38a discriminate against signal outputs below a given low amplitude in order to reject the signals associated with "noise". In response to a detector output above the discrimination level, each of the pulse shapers produces a constant duration pulse. The output from pulse shaper 38 is applied to gating circuits 40 and 41 which are under control of monostable multivibrators 43 and 45, respectively. The output from pulse shaper 38a is applied to gating circuits 40a and 41a which similarly are under control of the respective multivibrators 43 and 45. Thus the output from the multivibrator 34 is applied to multivibrator 43 which produces a positive pulse during a desired period of the time window occurring within the thermalization region. This time window occurs within 100 microseconds subsequent to the fast neutron burst. Typically, the time window may start approximately 5 to 10 microseconds after termination of the fast neutron burst and extend for a period of 10 to 30 microseconds. The pulse from multivibrator 43 actuates gating circuits 40 and 40a, thus allowing during this time period the output from the pulse shapers 38 and 38a to be applied to count rate meters 46 and 46a.

The output from multivibrator 43 is also applied to a monostable multivibrator 44 which functions to provide a further time delay before the start of the measurement window occurring during the thermal equilibrium diffusion period. Upon termination of the positive pulse from multivibrator 43, multivibrator 44 produces a positive pulse of a duration equal to the time between the termination of the first time window within the thermalization period and initiation of the time window within the thermal equilibrium diffusion period. The output from multivibrator 44 is applied to the monostable multivibrator 45 which controls the operation of gates 41 and 41a. Upon termination of the positive pulse from multivibrator 44, multivibrator 45 produces a positive pulse of the desired duration of the time window occurring within the thermal equilibrium diffusion period. This time window normally is initiated at least 100 microseconds subsequent to the fast neutron burst. This pulse opens gates 41 and 41a, thus allowing the outputs from pulse shapers 38 and 38a to be applied to count rate meters 48 and 48a. Count rate meters 46, 46a, 48, and 48a produce DC voltages proportional to the pulse rates from the pulse shapers during the periods that their respective gates are open. The count rate meters may be of any suitable type but typically will take the form of an RC averaging circuit with a relatively long time constant on the order of several seconds. Thus, the voltage outputs from the count rate meters are representative of the gated pulse rates from the pulse shapers over a great many cycles of operation.

The outputs from count rate meters 48 and 48a are applied to a ratio unit 50 which produces a DC voltage which is proportional to the ratio of the output from count rate meter 48 to the output from count rate meter 48a. Thus, the output from ratio unit 50 is representative of the ratio "K" described previously.

The output from ratio unit 50 is applied to a multiplier 52 along with the output from count rate meter 46a and to a multiplier 54 along with the output from a voltage generator 55. Voltage generator 55 produces a DC voltage signal which is proportional to the detector coefficient $Z_1$. The outputs from multipliers 52 and 54 are applied to the negative inputs of difference units 56 and 58, respectively. The output of voltage generator 59 is also applied to difference unit 58. Generator 59 produces a DC voltage proportional to the detector coefficient $Z'_1$. The outputs from difference units 56 and 58 are provided to logarithmic units 60 and 61, respectively, which produce voltage signals proportional to the natural logarithm of the applied inputs. Thus, logarithmic unit 60 produces a voltage proportional to the natural logarithm of the difference between the output from count rate meter 46 and the output from multiplier 52. The outputs from logarithmic units 60 and 61 are applied to a difference circuit 62 which functions to subtract the output from logarithmic unit 60 from the output from logarithmic unit 61. The output from difference unit 62 is inversely proportional to the value of $T_{th}$ and is applied to recorder 64 where it is recorded in correlation with the depth of the logging tool within the well. In this case, the amplitude of the recorded parameter increases as the relative amount of water within the formation pore space increases.

Figure 4:
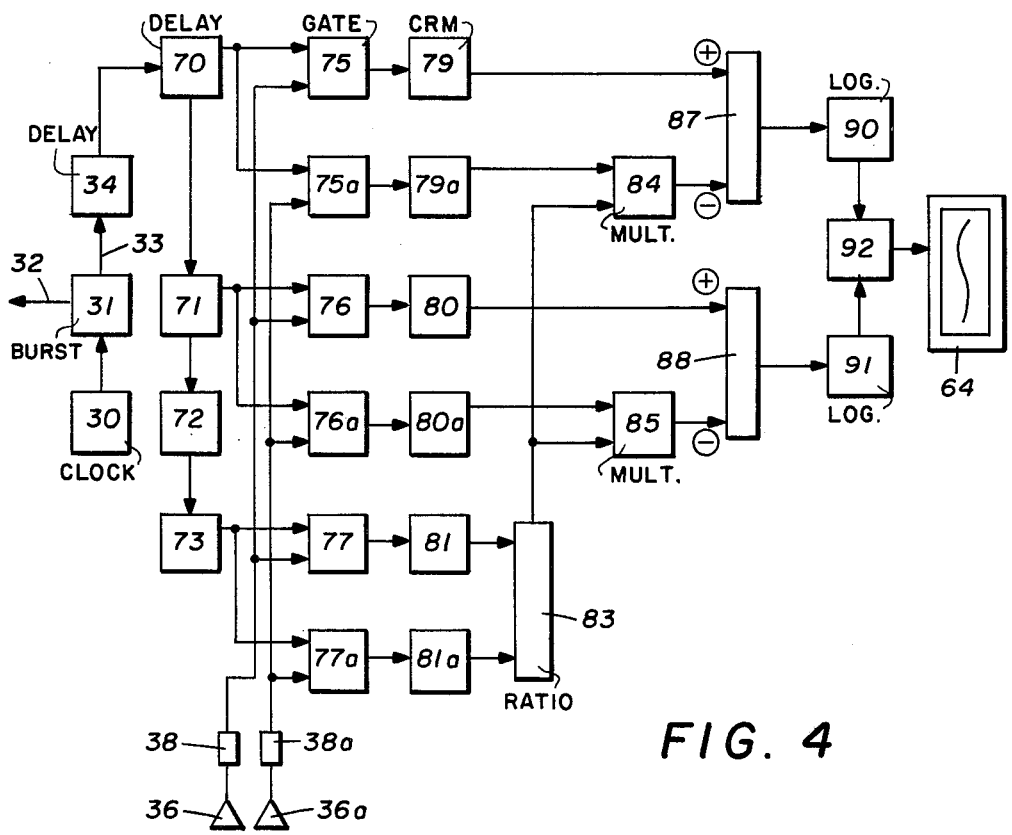
FIG. 4 is a block schematic of circuitry which may be employed in the system of FIG. 2 in accordance with another embodiment of the invention.

In a further and preferred embodiment of the invention, the count rates from detectors 26 and 27 are measured during two time windows occurring within the thermalization period. In addition, the count rate from each of the detectors is measured during a time window occurring within the thermal equilibrium diffusion period in order to arrive at the value "K" as described previously. Measuring and analysis circuitry suitable for use in carrying out this embodiment of the invention is illustrated in FIG. 4. The outputs from detectors 26 and 27 are applied to the circuitry via amplifiers 36 and 36a and pulse shapers 38 and 38a and the circuit operates under the control of clock 30, burst control unit 31, and delay unit 34 as described previously. The output from delay unit 34 is applied to a string of monostable multivibrators 70, 71, 72, and 73. Multivibrator 70 controls gates 75 and 75a to provide first time windows for detectors 26 and 27 during the thermalization period. Multivibrator 71 controls gates 76 and 76a and functions to open these gates for the desired period of the time window immediately upon termination of the pulse from multivibrator 70. In the embodiment shown, each of the time windows occurring during the thermalization period is of the same duration and may extend for a period within the range of about 2 to 30 microseconds. The output from multivibrator 71 is also applied to multivibrator 72 which provides a further time delay before multivibrator 73 is actuated to open gates 77 and 77a during the thermal equilibrium diffusion period.

The gated output from detector 26 is applied via pulse shaper 38 to count rate meters 79, 80, and 81 and the gated output from detector 27 is applied via pulse shaper 38a to count rate meters 79a, 80a, and 81a. The outputs from count rate meters 81 and 81a are applied to a ratio circuit 83 which produces an output representative of "K" as described previously. The output from ratio unit 83 is applied to a multiplier 84 along with the output from count rate meter 79a and to multiplier unit 85 along with the output from count rate meter 80a. The outputs from multipliers 84 and 85 are subtracted from the outputs from count rate meters 79 and 80 in difference circuits 87 and 88, respectively. The signals from the difference units are applied to logarithmic units 90 and 91 which produce voltage signals proportional to the natural logarithm of the applied inputs. These signals are applied to difference unit 92 to produce an output which is inversely proportional to the thermalization time constant in accordance with equation (11). This input is applied to recorder 64 where again the value of the recorded parameter increases as the percentage of the water in the formation pore volume increases.

The time constant $T_{th}$ decreases with an increase in porosity, i.e., total hydrogen content of the formation, as well as an increase in the relative water content of the formation fluid. Thus, in order to accurately relate the outputs from the embodiments of FIGS. 3 and 4 to the relative oil-water content of the formation, it is desirable to correlate the parameter recorded by recorder 64 with the porosity of the formation. Thus, where the formation porosity is unknown the logging tool of the present invention may be run in conjunction with a porosity log such as may be obtained employing a steady-state neutron source as described previously or a pulsed neutron source as described in U.S. Pat. No. 4,097,737 to Mills. The output from the difference unit 62 (FIG. 3) or 92 (FIG. 4) may then be adjusted for porosity by any suitable technique. For example, the recorded parameter may be compared to calibration curves developed by operating the logging tool in "standard" formations of known porosity and oil-water content.

The detectors 26 and 27 may be of any suitable type so long as they have different energy-dependent sensitivities to slow neutrons at energy levels below the chemical binding energy of hydrogen in the hydrogenous fluids contained within the formation. As a practical matter, detectors 26 and 27 have different energy-dependent sensitivities to neutrons at energy levels less than 4 electron volts and preferably at energy levels below 2 electron volts. For example, each of the detectors 26 and 27 may take the form of a helium-3 proportional counter of the type disclosed in U.S. Pat. No. 3,102,198 to Bonner. Detectors of this type exhibit a detection efficiency of near 100% for thermal neutrons and very low energy epithermal neutrons. As the energy level of the neutrons increases the detection efficiency of the detector declines. This rate of decline is dependent upon the helium-3 pressure within the detector. Thus, detector 26 may have a relatively high helium-3 pressure and detector 27 a relatively low helium-3 pressure. For example, the helium-3 pressure within detector 26 may be at 10 atmospheres. Detector 27 may exhibit a lower helium-3 pressure of about 2 atmospheres. Thus the detection efficiency of detector 27 will decline at a significantly greater rate with an increase in neutron energy level than the detection efficiency of detector 26.

The differential energy-dependent sensitivities of the detectors 26 and 27 may also be accomplished through the use of suitable filters. For example, detectors 26 and 27 may take the form of identical helium-3 proportional counters with detector 27 provided with a filter which preferentially absorbs very low energy neutrons. Detector 27 may be provided with a copper filter which functions to absorb low energy neutrons to provide a detector having a relatively low sensitivity to thermal neutrons. The "bare" counter 26 would, of course, be responsive to thermal neutrons as described previously. If desired, both detectors could be provided with filters; for example, detector 26 could be provided with a copper filter and detector 27 with a silver filter which is a stronger absorber of slow neutrons than is copper.

We claim:

1. In the logging of a well penetrating a subterranean formation containing hydrogenous fluid therein, the method comprising:
   (a) irradiating said formation with a burst of fast neutrons whereby fast neutrons enter said formation and are moderated therein to form a population of slow neutrons comprised predominantly of epithermal neutrons during a thermalization period occurring subsequent to said fast neutron burst and comprised predominantly of thermal neutrons during a thermal equilibrium diffusion period occurring subsequent to said thermalization period,
   (b) employing a first neutron detector to measure the count rate of slow neutrons within an energy range having a lower limit which is less than the chemical binding energy of hydrogen in said hydrogenous fluid during a first time window occurring within said thermalization period and during at least another time window occurring within said thermal equilibrium diffusion period, and
   (c) employing a second neutron detector having a different energy-dependent sensitivity than said first detector to slow neutrons at energy levels less than the chemical binding energy of hydrogen in said hydrogenous fluid to measure the count rate of slow neutrons during said first time window occurring within said thermalization period and said at least another time window occurring within said thermal equilibrium diffusion period.

2. The method of claim 1 further comprising the step of establishing a ratio function representative of the ratio of the count rates from said first and second detectors during said thermal equilibrium diffusion period.

3. The method of claim 2 wherein said ratio function is obtained by dividing the count rate from said first detector by the count rate from said second detector and further comprising the step of applying said ratio function to the count rate measured by said second detector during said thermalization period.

4. The method of claim 1 wherein the count rate of slow neutrons is measured by said first and second detectors during a second time window occurring within said thermalization period.

5. The method of claim 4 further comprising the step of establishing a ratio function representative of the ratio of the count rates from said first and second detectors during said thermal equilibrium diffusion period.

6. The method of claim 5 wherein said ratio function is obtained by dividing the count rate from said first detector by the count rate from said second detector and further comprising the step of applying said ratio function to the count rates measured by said second detector during each of said first and second time windows within said thermalization period.

7. In a well logging system the combination comprising:
   (a) a logging tool adapted for insertion into a wellbore,
   (b) a neutron source in said tool for emitting repetitive time-spaced bursts of fast neutrons,
   (c) a first neutron detector in said tool for detecting slow neutrons within an energy range having a lower limit which is less than 4 electron volts and producing an output signal in response to said detected slow neutrons,
   (d) a second detector in said tool for detecting slow neutrons within an energy range having a lower limit which is less than 4 electron volts and producing an output signal in response to said detected neutrons, said second detector having a different energy-dependent sensitivity than said first detector to neutrons at energy levels less than 4 electron volts,
   (e) means for separately measuring the count rates from said first and second detectors during a first time window between said fast neutron bursts and occurring within 100 microseconds subsequent to said fast neutron bursts, and
   (f) means for separately measuring the count rates from said first and second detectors during a later time window between said fast neutron bursts and occurring at least 100 microseconds subsequent to said fast neutron bursts.

8. The system of claim 7 further comprising means for producing a ratio function representative of the ratio of the count rate from said first detector to the count rate from said second detector during said later time window.

9. The system of claim 8 further comprising means for applying said ratio function to the count rate from said second detector during said first time window.

10. The system of claim 7 further comprising means for separately measuring the count rates from said first and second detectors during a second time window between said fast neutron bursts and occurring prior to said later time window and within 10 to 100 microseconds subsequent to said fast neutron bursts.

11. The system of claim 10 further comprising means for producing a ratio function representative of the ratio of the count rate from said first detector to the count rate from said second detector during said later time window.

12. The system of claim 11 further comprising means for applying said ratio function to the count rates from said second detector during said first and second time windows.

* * * * *